United States Patent [19]

Davis

[11] Patent Number: 4,687,109
[45] Date of Patent: Aug. 18, 1987

[54] RADIO CONTROLLED ELECTRIC SLACK PULLER, BRAKE AND BATTERY RECHARGING SYSTEM

[76] Inventor: Glenn T. Davis, 17454 Alsea Hwy., Alsea, Oreg. 97324

[21] Appl. No.: 881,817

[22] Filed: Jul. 3, 1986

[51] Int. Cl.$^4$ .............................................. B66C 21/00
[52] U.S. Cl. ....................................... 212/76; 212/94; 212/122; 212/126
[58] Field of Search ...................... 212/71, 76, 77, 83, 212/87, 94, 110, 116, 122, 126; 104/93, 112, 115, 116, 173 R, 178

[56] References Cited

U.S. PATENT DOCUMENTS

| | | | |
|---|---|---|---|
| 3,776,390 | 12/1973 | Junes et al. | 212/122 |
| 3,863,774 | 2/1975 | Brandt | 212/122 |
| 4,127,197 | 11/1978 | Dumont | 212/122 |
| 4,164,289 | 8/1979 | Haliewicz | 212/122 |
| 4,456,131 | 6/1984 | Kuehn | 212/122 |
| 4,515,281 | 5/1985 | Maki | 212/122 |

Primary Examiner—Joseph F. Peters, Jr.
Assistant Examiner—Stephen P. Avila
Attorney, Agent, or Firm—Kimmel, Crowell & Weaver

[57] ABSTRACT

An all-electric radio controlled slack pulling, braking and battery recharging system for logging operations on a moutainside is disclosed. Independent battery powered slack pulling and radio and brake electrical systems are provided, together with alternators which recharge the storage batteries of the electrical system in response to movement of alternator driving sheaves along a skyline in either direction. The drop or skidline is pulled through a carriage by a electric slack puller motor connected through a torque multiplier with a line pulling sheave. Skyline and drop or skidline brakes are applied by low pressure hydraulics boosted by spring pressure and are released by higher hydraulic pressure.

10 Claims, 4 Drawing Figures

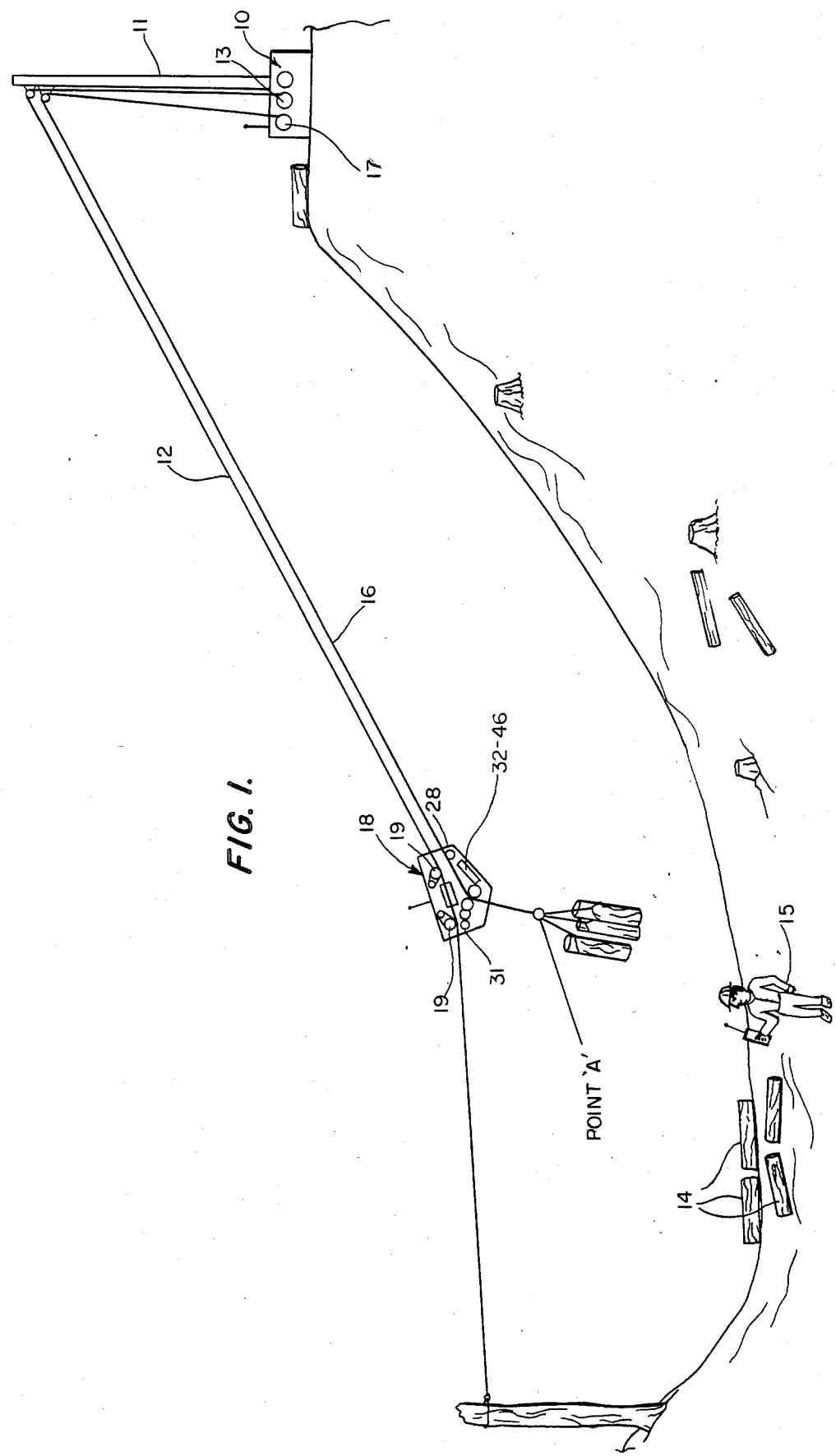

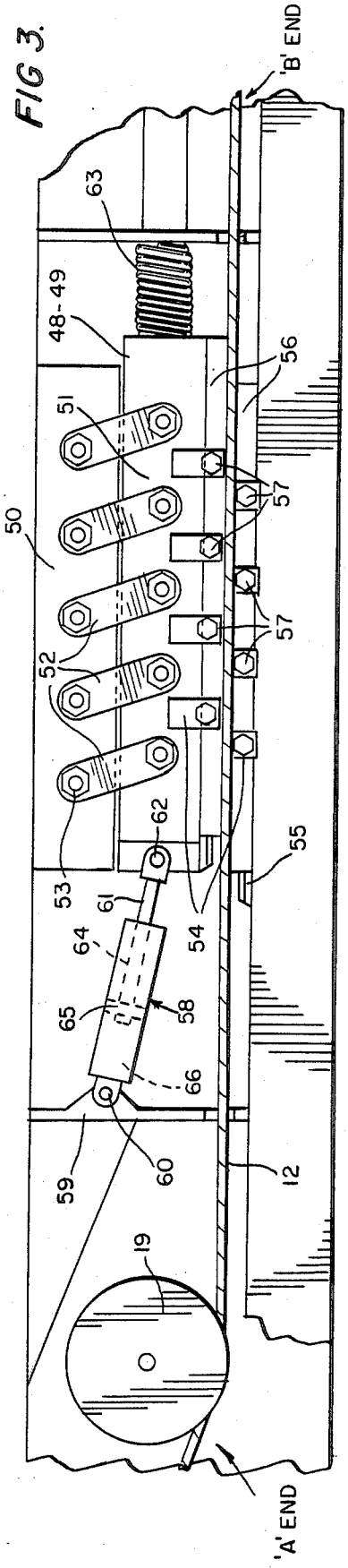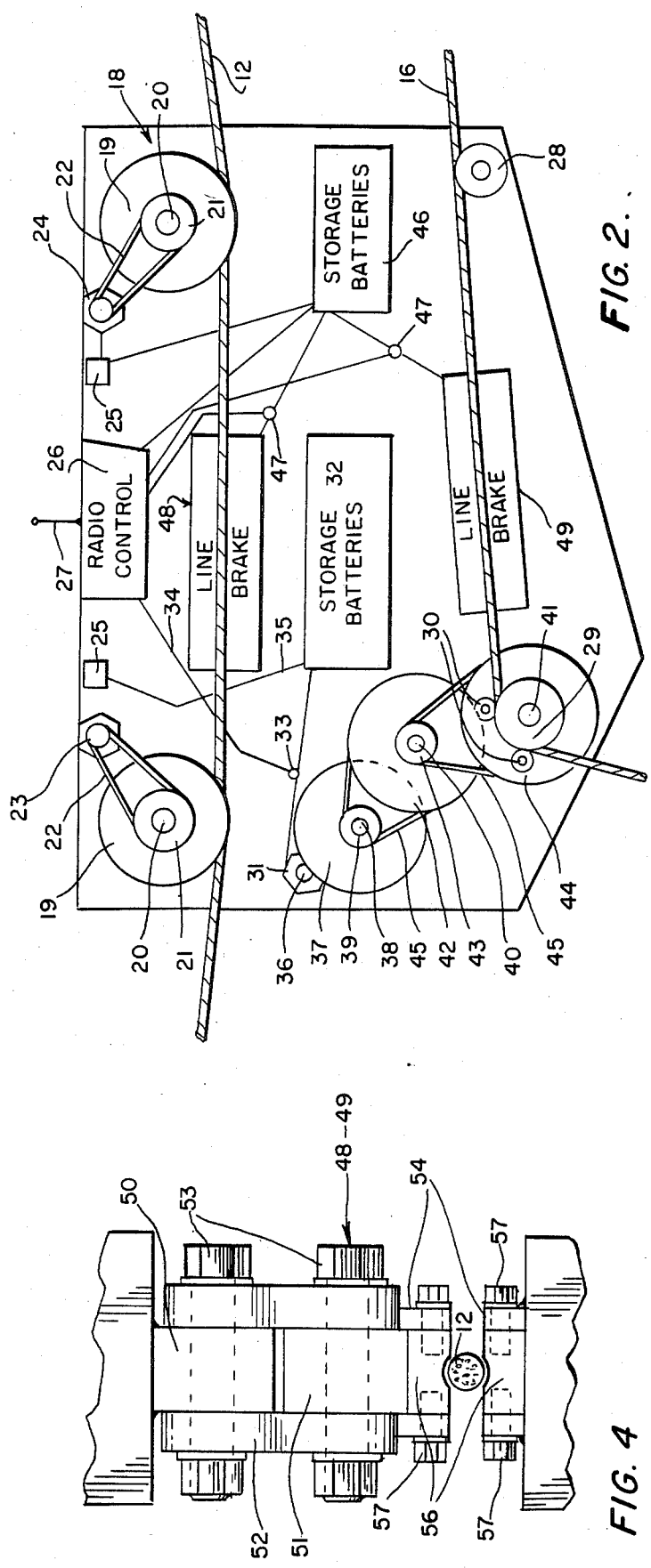

RADIO CONTROLLED ELECTRIC SLACK PULLER, BRAKE AND BATTERY RECHARGING SYSTEM

BACKGROUND OF THE INVENTION
1. Technical Field:

The present invention relates broadly to an improved log yarding system and more particularly relates to an all-electric slack pulling carriage for transporting logs or other objects on a mountainside or the like.

2. The Prior Art:

Several types of radio controlled systems for log yarding are known in the prior art. One such system includes a radio controlled slack pulling carriage having hydraulically operated skyline and skidline brakes and an on-board internal combustion engine.

Another similar prior art arrangement includes a radio controlled skycar having a considerably larger on-board internal combustion engine operatively associated with an on-board cable hoist to operate a drop line connected with logs or the like to be transported.

Generally, in the prior art, high pressure hydraulics is employed to operate the skyline and drop or skidline brakes. This necessitates providing on-board accumulators to store hydraulic fluid under pressure to operate the brakes or hydraulic pumps to operate the brakes. If the carriage or skycar has relatively little movement on the skyline, the hydraulic accumulators will not be pressurized sufficiently to operate for any significant time period, and this can severely limit the utility of the entire system.

SUMMARY OF THE INVENTION

The present invention is summarized as an electrical log yarding system under radio control in which storage batteries contained in a carriage are charged by on-board alternators and voltage regulators during movement of the carriage along a skyline in either direction. A slack puller electric motor is powered by one set of storage batteries and is drivingly connected through a torque multiplier means with a line pulling sheave engaged with a drop or skidline. Electrically controlled skyline and skidline brakes powered by an independent set of batteries and associated control relays are applied by low hydraulic pressure and booster mechanical means, such as a strong spring, and are released by higher hydraulic pressure. The brakes of the present invention are directional, in that they cannot slip while "on" and increasing loads on the applied brakes cause them to grip ever more tightly.

Accordingly, a primary object of the present invention is to provide a system for log yarding or for similar purposes which is more simplified, more convenient and reliable, safer and less costly than prior art systems.

A further object of the invention is to eliminate the customary internal combustion engine and the hydraulic accumulators and pumps commonly employed on prior art slack pulling carriages and radio controlled skycars. In the present invention, storage batteries replace prior art hydraulic accumulators, and possess far greater power storage capacity than accumulators. The storage batteries receive electrical power from on-board alternators which generate electrical power when turning in either direction. In contrast to this, hydraulic pumps require substantial power to operate, and generally pumps are unidirectional and cannot pressurize an accumulator when turning in opposite directions like an electrical alternator of the type employed in the present invention.

A further important object of the invention is to provide a radio controlled all-electric log yarding system in which skyline and drop or skidline brakes do not rely on high pressure hydraulics for their application, but instead are released by high pressure hydraulics, and are applied by low pressure hydraulics and mechanical means, such as a spring. This feature promotes safety and reliability compared to hydraulically applied brakes which are dependent on pumps and accumulators.

Still another object of the invention is to provide an all-electric self-contained radio controlled device of the mentioned character which is in no way dependent on hydraulics in its primary operation and in which the slack puller is independent of the electro-hydraulic brakes and their charging system, except for the radio and its control switches and relays which control the functioning of the entire carriage.

Other features and advantages of the invention will become apparent to those skilled in the art during the course of the following description.

BRIEF DESCRIPTION OF THE DRAWINGS

FIG. 1 is a schematic side elevation of a log yarding system according to the present invention.

FIG. 2 is an enlarged partly schematic side elevation of a carriage and on-board components according to the invention.

FIG. 3 is a side elevation of an electrically operated radio controlled brake utilized in the invention.

FIG. 4 is an end elevation of the brake structure shown in FIG. 3.

DETAILED DESCRIPTION

Referring to the drawings in detail wherein like numerals designate like parts, a conventional yarder 10 at the top of a mountainside includes a suitably guyed tower 11 from which is reeved a skyline 12 connected with a winch drum 13 of the yarder. The far end of the skyline 12 is suitably anchored to a tree stump or some other fixed member.

Logs 14 or similar heavy objects requiring transport to the top of the mountainside are attached at A by a downhill worker or workers 15 to a drop or skidline 16 also reeved to the top of the yarder tower 11 and connected with a winch drum 17 of the yarder 10.

A carriage 18 contains near its upper corners a pair of skyline sheaves 19 which rollingly engage the skyline 12 at all times. The sheaves 19 includes shafts 20 which rotate therewith and alternator drive pulleys 21 or sprocket gears are carried by and turn with the skyline sheaves 19 and their shafts 20. The pulleys 21 are connected by belts 22 with the shafts of slack puller and radio and brake alternators 23 and 24, each having a voltage regulator 25 operatively connected therewith.

The carriage includes an on-board radio control compartment 26 having an antenna 27. Through this means, the carriage 18 is under control of the worker or workers 15 who are equipped with radio controllers. Similarly, the yarder operator has radio controlled means to operate the carriage or another worker adjacent to the yarder has a radio controller to operate the carriage.

The drop or skidline 16 is reeved over an alignment sheave 28 near one lower corner of the carriage 18 and is also reeved over a line pulling sheave 29 near the other lower corner of the carriage having a pair of critically spaced adjustable springloaded drop or skidline pressure rolls 30. A slack puller electric drive motor 31 is fixed in the carriage 18 near one side thereof between the top and bottom of the carriage 18 and receives electrical power from slack puller storage batteries 32 held in the carriage through a motor control relay 33 electrically connected by conductor means 34 with the radio control compartment 26. The voltage regulator 25 is similarly electrically connected by conductor means 35 with the slack puller storage batteries 32.

The slack puller electric drive motor 31 includes a motor gear 36 which, upon starting of the motor 31, instantly engages and drives a bull gear 37. Rotation of the shaft of motor 31 pushes the teeth of gear 36 into the teeth of the bull gear 37 in the same way that an automobile starter engages itself with the flywheel gear of the engine, by the use of the well-known Bendix spring. When power to the slack puller motor 31 is terminated, the motor gear 36 instantly disengages itself from the bull gear 37.

The slack puller motor 31 drives the drop or skidline pulling sheave 29 through a torque multiplying system which may consist of gears, sprockets and chains, or belts and pulleys. As shown in FIG. 2, the torque multiplying system includes the rotation shaft 38 for the bull gear 37 and a smaller diameter drive sprocket 39 fixed on the shaft 38. Two additional spaced parallel axis rotation shafts 40 and 41 are included in the system. The rotation shaft 40 mounts a large sprocket 42 and a smaller drive sprocket 43. The shaft 41 mounts another large sprocket 44 and also mounts the line pulling sheave 29. Roller chains 45 drivingly connect the smaller sprockets 39 and 43 with the larger sprockets 42 and 44, as shown. As previously noted, a pulley and belt or direct gear torque multiplier arrangement may be employed if preferred rather than the described chain and sprocket drive.

The carriage 18 further contains radio and brake storage batteries 46 separate from the slack puller batteries 32. The storage batteries 46 are electrically connected with one voltage regulator 25 and with the radio control compartment 26. The storage batteries 46 are connected electrically through brake control relays 47 with two independent brakes 48 and 49, or clamps, for the skyline 12 and drop or skidline 16, respectively. The operation of the brakes 48 and 49 is electrically controlled. The brakes are applied by low hydraulic pressure assisted by spring force but are released by relatively high hydraulic pressure, as will be further described. The brake control relays 47 are also electrically linked with the radio control compartment 26, as shown in FIG. 2 and with the radio and brake storage batteries 46.

The two brakes 48 and 49 are essentially the same in construction and operation and a detailed description of one brake will serve to describe both. FIGS. 3 and 4 show the details of each brake 48 and 49.

Each brake 48 and 49 comprises a base block 50 attached to the frame of carriage 18, and further comprises a swing block 51, swing arms 52 and swing pins 53. Brake lining retainers 54 are welded to the swing block 51 and to the frame of the carriage 18. Brake lining stops 55 are also welded to the swing block 51 and carriage frame. Replaceable brake linings 56 are secured to the retainers 54 by bolts 57.

A brake operating cylinder 58 has its cylinder body secured to an anchor member 59 as at 60 and has its rod 61 secured to the swing block 51 at 62. A large compression spring 63 engages one end of the swing block 51 and assists the cylinder 58 in retracting and also assists in applying the brake with greater speed.

The two brakes 48 and 49 may be of the same size, but if the skyline 12 and drop or skidline 16 are of different sizes, the brake linings 56 must be chosen to properly fit the two lines. The brakes 48 and 49 are directional in the sense that the end of the brake designated A, FIG. 3, is always the load end of the brake. When the brake is "on", the line or cable 12 could possibly be slipped from end A to end B, FIG. 3, but not vice-versa. The load on the drop or skidline 16 determines how much brake pressure must be applied to prevent the dropline from moving through the brake.

As previously noted, the brakes 48 and 49 are independently applied by low hydraulic pressure in the cylinder chamber 64 on one side of the piston 65 with the assistance of the spring 63 which produces faster brake application. Each brake is released by relatively high pressure in the cylinder chamber 66 on the other side of the piston 65. The low pressure chamber 64 forms a reservoir for the hydraulic fluid or oil which is pumped around the piston 65 and into the high pressure chamber 66 by conventional means when the brake is released. The brakes according to the present invention therefore differ notably from the prior art in that high pressure hydraulics is employed only to release the brake or clamp, and this is opposite to customary practice.

Operation

When the worker 15 or yarder operator gives a radio command to the carriage radio control means in the compartment 26, the slack puller motor 31 is automatically turned on and begins operating. The motor gear 36 begins driving the bull gear 37, and through the described torque multiplier train, the line pulling sheave 29 begins turning.

When the operator discontinues the radio signal to the carriage compartment 26, the slack puller motor 31 is shut off and its gear 36 instantly disengages itself from the bull gear 37. This, in turn, interrupts the operation of the line pulling sheave 29. While the line pulling sheave 29 is in operation, the drop or skidline brake 49 is in a released state so that the line 16 can be pulled through it. When the slack puller motor 31 and line pulling sheave 29 are stopped, the brake 49 is instantly reapplied to grip the line 16 in order to prevent further movement of that line or cable through the carriage. The electro-hydraulic controls for each brake cylinder 58 are entirely conventional.

By multiplying the torque produced by the motor 31 to the line pulling sheave 29, the amount of current drawn from the storage batteries 32 is materially lessened, and the speed at which the line 16 is pulled through the carriage 18 can be regulated.

The alternators 23 and 24 and voltage regulators 25 which recharge the batteries 32 and 46 in the carriage 18 are driven as previously described by the skyline sheaves 19 whose shafts rotate as the carriage 18 moves up or down the skyline 12 in either direction, by gravity or under influence of the yarder hoist 13, or winch drum.

It may now be seen that the present invention differs from the known prior art in that it is an all-electric self-contained radio controlled system with no direct use of hydraulics in the overall system operation. The slack pulling capability of the invention is independent in its operation from the electrichydraulic brakes 48 and 49 and their battery charging system, except for the radio control means which are common to the entire apparatus or system.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An electric radio controlled log yarding carriage comprising:
    a skyline and a drop or skidline,
    a yarder means operatively connected with said skyline and skidline,
    a carriage having radio control means and storage battery means electrically connected with the radio control means,
    storage battery charging means on the carriage including at least a sheave rollingly engaging said skyline and operating the charging means while traveling in either direction along the skyline,
    electrically controlled skyline and skidline brakes on the carriage and being electrically connected with said storage battery means and radio control means,
    a skidline slack pulling sheave on the carriage engaged with the skidline,
    an electrical slack pulling motor on the carriage electrically connected with the storage battery means and radio control means, and
    a torque multiplier means connected between the electrical slack pulling motor and said skidline slack pulling sheave.

2. An electric radio controlled log yarding carriage as defined in claim 1, and said storage battery means comprising separate storage batteries on the carriage for said brakes and slack pulling motor and being electrically connected therewith, and said storage battery charging means including a pair of independent electrical alternators on the carriage each being operatively connected with a skyline sheave, one alternator being electrically connected with said brake and radio storage batteries and the other alternator being electrically connected with the storage batteries for said slack pulling motor.

3. An electric radio controlled log yarding carriage as defined in claim 1, and each of said brakes including a swing block having brake lining means thereon and an opposing relatively fixed brake lining means, a brake cylinder connected with said swing block and having a low pressure chamber to apply brake setting pressure to the swing block and a high pressure chamber to apply brake releasing pressure to the swing block, and a booster mechanical means acting on the swing block and assisting the low pressure chamber in setting the brake.

4. An electric radio controlled log yarding carriage as defined in claim 3, and said swing block being carried by pivotal swing links whose pivoted ends are offset relative to the swing block in such a way that the brake cannot slip when in the set position relative to a line but engages the line ever more tightly as tension on the line increases in one direction.

5. An electric radio controlled log yarding carriage as defined in claim 3, and said booster mechanical means comprising a spring acting on one end of the swing block, said brake cylinder being connected with the opposite end of the swing block.

6. An electric radio controlled log yarding carriage as defined in claim 3, and said brake lining means comprising replaceable swing block and relatively fixed brake linings, and retainers carrying the brake linings releasably whereby the brake linings can be replaced when worn.

7. An electrical radio controlled log yarding carriage comprising:
    skyline and skidline means,
    a carriage having a pair of skyline engaging sheaves and a skidline slack pulling sheave,
    an electric slack puller motor on the carriage,
    a torque multiplier train connected between the slack puller motor and slack pulling sheave,
    a pair of independent skyline and skidline electrically controlled brakes on the carriage,
    a pair of storage battery packs on the carriage one for said slack puller motor and one for said brakes and radio,
    a pair of charging devices for said battery packs on the carriage connected with and driven by said skyline sheaves, and
    radio control means on the carriage electrically connected with said battery packs, said brakes and said slack puller motor.

8. An electrical radio controlled log yarding carriage as defined in claim 7, and said pair of charging devices comprising a pair of electrical alternators, and a pair of voltage regulators connected between said alternators and the battery pack for the slack puller motor and the battery pack for said brakes.

9. An electrical radio controlled log yarding carriage as defined in claim 8, and a motor control relay connected between the slack puller motor and the battery pack for the slack puller motor, and a pair of brake control relays connected between said brakes and the battery pack for said brakes.

10. An electrical radio controlled log yarding carriage as defined in claim 9, and a radio control means on the carriage electrically coupled to the motor control relay and brake control relays and also electrically coupled with the battery pack for said brakes.

* * * * *